United States Patent [19]

Rilling

[11] Patent Number: 4,797,950
[45] Date of Patent: Jan. 10, 1989

[54] MULTIPATH REDUCTION SYSTEM

[76] Inventor: Kenneth Rilling, 1190 Crestline Dr., Cupertino, Calif. 95014

[21] Appl. No.: 103,939

[22] Filed: Oct. 2, 1987

Related U.S. Application Data

[63] Continuation-in-part of Ser. No. 928,839, Nov. 10, 1986, Pat. No. 4,736,460.

[51] Int. Cl.$^4$ ............................................. H04B 7/08
[52] U.S. Cl. ................................. 455/276; 455/139; 455/304
[58] Field of Search ............... 455/52, 137, 138, 139, 455/272–278, 304, 283; 375/100, 102

[56] References Cited

U.S. PATENT DOCUMENTS

| | | | |
|---|---|---|---|
| 4,085,368 | 4/1978 | Yeh | 455/273 |
| 4,160,952 | 7/1979 | Seastrand Jr. | 455/276 |
| 4,210,871 | 7/1980 | Hill et al. | 455/273 |
| 4,261,056 | 4/1981 | Barnett et al. | 455/239 |
| 4,584,712 | 4/1986 | Isobe et al. | 455/276 |
| 4,710,975 | 12/1987 | Okamoto | 455/276 |
| 4,715,048 | 12/1987 | Masamura | 455/276 |
| 4,736,455 | 4/1988 | Matsue et al. | 455/278 |

*Primary Examiner*—Robert L. Griffin
*Assistant Examiner*—Curtis Kuntz
*Attorney, Agent, or Firm*—Allston L. Jones

[57] ABSTRACT

The effects of multipath and other interference signals in communication receivers are reduced by implementing an adaptive array. The invention addresses a signal environment in which the directions of arrival and the time of arrival of the signal of interest and the unwanted multipath or interference signals are unknown. The feedback equation of the LMS adaptive array is changed so that a reference signal is not needed. The system uses the strongest received signal as the signal of interest and rejects the other received signals.

22 Claims, 16 Drawing Sheets

MULTIPATH REDUCTION SYSTEM

CROSS REFERENCE

This is a continuation in part of a copending U.S. patent application filed on Nov. 10, 1986 bearing Ser. No. 928,839 now U.S. Pat. No. 4,736,460, and entitled Multipath Reduction System.

BACKGROUND

To get high quality reception, communication systems, which include radio and television, require a strong signal that is not corrupted by noise or interference. One form of interference that can severely degrade reception is multipath. Multipath occurs when the transmitted signal arrives at the receiver simultaneously from more than one direction. The multiple paths are generally due to reflections of the transmitted signal from hills, buildings, etc.; they can also be the result of atmospheric phenomena. The indirect paths are longer than the direct path, and consequently, the indirect path signals arrive at the receiver later in time than the corresponding direct path signal. This makes them arrive at the receiver with a different phase than the direct path signal, and, consequently, causes distortion in both the phase and the amplitude of the received signal. This can result in deep signal strength fades, overlapping data, clicking, etc. Examples of multipath distortion are ghosts on TV, degraded fidelity in commercial FM stereo, and loss of data in communication links.

Designing the antenna pattern gain characteristics to reject the indirect paths by placing a null in their direction of arrival is one of the better approaches to reducing multipath distortion. This eliminates the indirect paths altogether. It is easy to accomplish when conditions are known and do not change. But in most communication situations, conditions do change. The adaptive array has been used to automatically change the antenna pattern as the conditions change.

In applying an adaptive array to the general communications problem where the direction of arrival (DOA) and the time of arrival (TOA) of the signal of interest are unknown, the least means squared error algorithm (LMS) is well suited. For optimal results, the LMS adaptive array requires a reference signal which is a replica of the signal of interest.

Generation of the reference signal can pose a problem. In practice, a replica of the transmitted signal is not available at the receiver. The reference signal must be derived from the adaptive array output signal. Robert Riegler and Ralph Compton (Proceedings of the IEEE, Vol. 61, No. 6, June 1973, p. 748) have discussed the application of the adaptive array to amplitude modulated communications signals, where the adaptive array output signal is processed to generate a representation of the carrier of the transmitted signal for use as the reference signal. But this approach addresses interference signals, not the multipath problem.

R. T. Compton and D. M. DiCarlo (IEEE Transactions on Aerospace and Electronic Systems, VOL. AES-14, NO. 4, July 1978, p. 599) and Y. Bar-Ness (IEEE Transactions on Aerospace and Electronic Systems, Vol. AES-18, No. 1, January 1982, p. 115) analyze another adaptive array which uses the array output to generate the reference signal. But their system was designed to address a signal environment in which the signal of interest is received along with a wideband interference signal. They do not address the multipath problem.

Ralph Compton (Proceedings of the IEEE, Vol. 66, No. 3, March 1978, p. 289) discusses an adaptive array for communication signals using a spread spectrum technique. The adaptive array uses knowledge of the spreading code to generate a reference signal. August McGuffin (U.S. Pat. No. 4,217,586) has extended this approach by utilizing the multipath in the reference signal generation. The pseudo random (PN) code based reference signal generator can keep lock even in severe multipath fading. But both these approaches require a known PN code be present in the transmitted signal to generate a reference signal.

G. H. Persinger (1977 International Conference on Communications, IEEE, Pt. III, Chicago, Ill., 12-15 June, 1977, Pp. 259-262) has used a low level PN code placed in quadrature (90 degrees out of phase) with a transmitted AM signal. It is used to generate the reference signal at the receiver. The reference generation is dependent on the injection of this special signal with a known code.

Peder Hansen (IEEE Transactions on Antennas and Propagation, Vol. AP-29, No. 6 November 1981, p. 836) has placed a special modulated pilot signal in the transmitted signal to be used to generate the reference signal. This technique was used specifically to discriminate against multipath. But it does not work without the special pilot signal.

Gayle Martin (U.S. Pat. No. 4,255,791) uses noise decorrelation to generate a reference signal for an adaptive array. This method addresses an environment where there is a large interfering signal, not the multipath environment.

Kenneth F. Rilling in U.S. patent application Ser. No. 819,416, filed on Jan. 16, 1986, entitled Anti-multipath Signal Processor, has amplitude limited the adaptive array output signal to generate the reference signal. This system rejects unwanted multipath and low level noise. But this work is limited to a reference signal implementation.

In a related technology, transversal filters (single input adaptive filters) which reduce TV ghosts by signal processing (not by using the antenna pattern) use the known portions of the transmitted TV signal structure to generate the reference signal (Shri Goyal, others, IEEE Transactions on Consumer Electronics, Vol. CE-26, February 1980). Transversal filters remove the ghosts after the received signal has been demodulated. But, they require a large number of loops, and they are generally microprocessor or computer based. Consequently, they are quite complicated and expensive.

An alternative to deriving the reference signal, is the elimination of the reference signal altogether by changing the feedback equations. Work along this line has been performed by John Treichler in a related technology with a single input adaptive filter for constant modulus (amplitude) signals (John R. Treichler and Brian G. Agee, IEEE Transactions on Acoustics, Speech, and Signal Processing, Vol. ASSP-31, No. 2, 1983, P. 459; M. G. Larimore and J. R. Treichler, International Conference of Acoustics, Speech, and Signal Processing 1983, Boston, P. 13). The Constant Modulus Algorithm (CMA) can be used to remove unwanted multipath for constant amplitude signals because it exploits the amplitude fluctuations induced by multipath. The CMA approach has limitations: (1) It only applies to wideband signals; it can not handle narrowband signals or an unmodulated carrier. (2) It requires a relatively large number of adaptive loops.

To summarize, with the exception of the patent application by Kenneth Rilling, the prior art is limited. It either does not address the multipath problem, it applies to a very limited range of signal classifications, its approach to the problem is complex, or it requires special tones or codes in the transmitted signal. And consequently, with the exception of the work by Rilling, there is no effective and inexpensive method of removing multipath interference at the communications receiver.

SUMMARY OF INVENTION

The object of this invention is to reduce distortions such as fading, data overlap, multiple images, and clicking caused by multipath in communication receivers. An adaptive array is used to reject unwanted signals with spatial filtering by placing an antenna pattern null in the direction of arrival of the unwanted signals. A second object of this invention is to reduce the negative effects of other types of noise and interference signals with amplitudes less than the amplitude of the desired signal by rejecting them also. The invention does this for a signal environment in which the TOA and the DOA of the desired signal and indirect path/interference signals are unknown and for which the transmitted desired signal contains no known codes, pilot signals, or signal waveform structures. This is accomplished by changing the feedback equation for the LMS adaptive array so that a reference signal is no longer required.

In addition, feedback equation approximations lead to new feedback equations, resulting in new CMA filter implementations.

DETAILED DESCRIPTION

Figure 1:
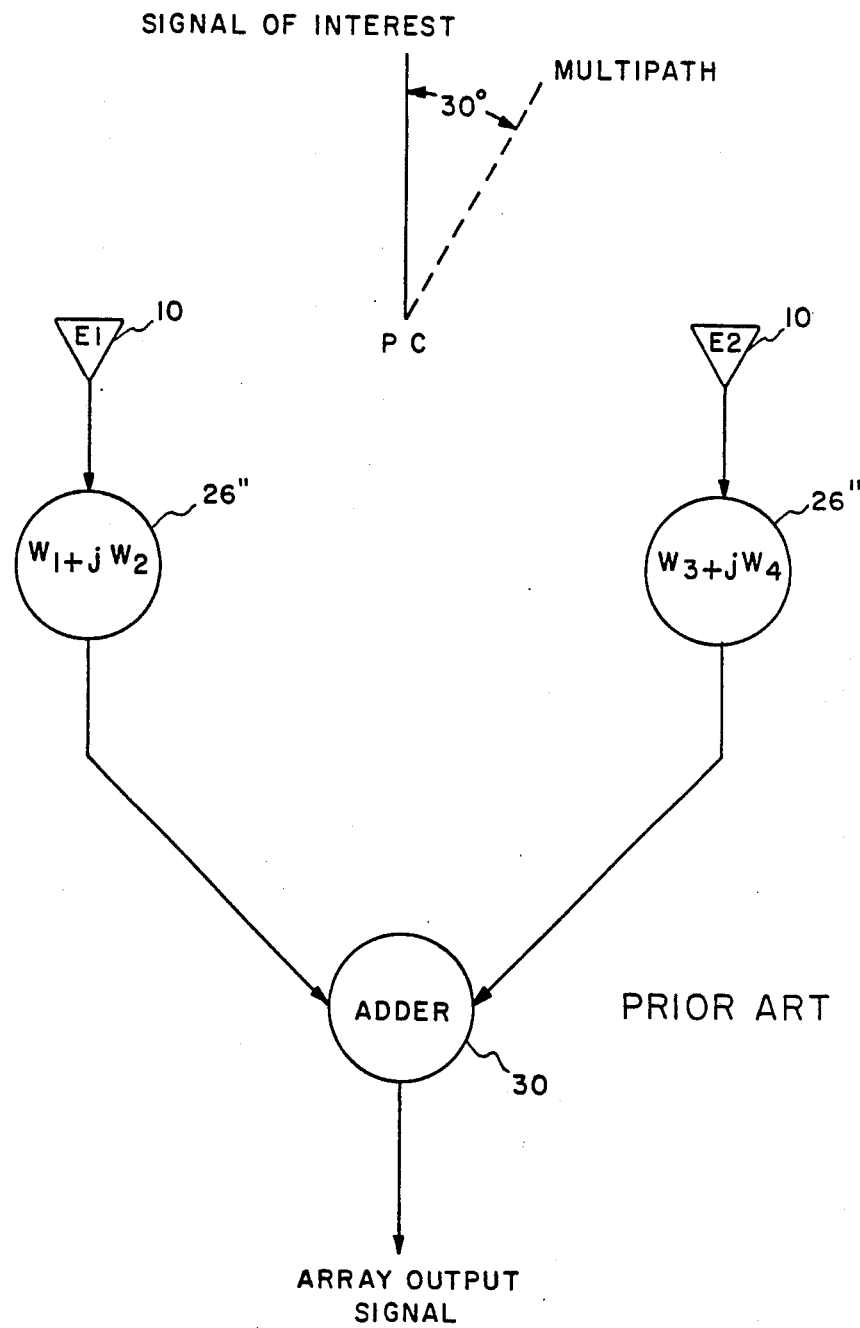
FIG. 1 is a block diagram of a two element array for the suppression of multipath and interference: prior art.

Before describing the preferred embodiment of the invention in detail, a discussion of multipath theory, adaptive arrays, and the new feedback equation theory of the class of adaptive arrays and filters used in this invention to solve the multipath problem will be presented to facilitate understanding.

NATURE OF MULTIPATH

In a multipath environment the transmitted signal arrives at the receiver from several directions simultaneously where there is a direct path and one or more indirect paths. The indirect paths are longer than the direct path, so the signals traveling these paths arrive at the receiver at a later time than the direct path signal. It is this difference in the time of arrival that causes distortion in both the amplitude and the phase of the received signal. For example, consider angle modulation (FM, PM, etc.); the direct path signal, in real notation, is $$X_1(t) = B_1 \sin[w(t-R_1/c) + af(t-R_1/c)] + n_1(t) \quad (1)$$

where w is the angular frequency, t is the time, f(t) is the modulation, $B_1$ is a constant amplitude, $R_1$ is the path length, c is the speed of light, $\alpha$ is the phase deviation, and $n_1(t)$ is a random noise term. The indirect path signal has the form $$X_i(t) = B_i \sin[w(t-R_i/c) + af(t-R_i/c)] + n_i(t) \quad (2)$$

where the $x_i(t)$ indicates the "i"th path signal, $B_i$ is a constant signal amplitude for the "i"th path, $R_i$ is the distance traveled by the "i"th path signal, and $n_i(t)$ is a random noise term. The $n_i(t)$ and $n_1(t)$ are all independent. The $X_i(t)$'s are all delayed versions of the direct path signal. The total signal present at a given point in space is the sum of the direct and indirect path signals. Using equations (1) and (2), the total received signal can be written as $$E(t) = X_1(t) + \sum_{i=2}^{N} X_i(t). \quad (3)$$

In equation (3), for mathematical convenience, the term $X_1(t)$ has subscript one and refers to the direct path signal, the $X_i(t)$ in the summation, where i=2 to i=N, refers to the indirect paths signals (or the interference signals). Summing over sinusoids, and for convenience assuming that the noise terms are small and can be neglected, equation (3) can be written as $$E(t) = A(t) \sin[wt + a(t)] \quad (4)$$

where $$A(t) = \left\{ \left[ \sum_{i=1}^{N} B_i \cos(P_i) \right]^2 + \left[ \sum_{i=1}^{N} B_i \sin(P_i) \right]^2 \right\}^{\frac{1}{2}}$$

$$\alpha(t) = \tan^{-1} \left\{ \left[ \sum_{i=1}^{N} B_i \sin(P_i) \right] / \left[ \sum_{i=1}^{N} B_i \cos(P_i) \right] \right\}$$

and $$P_i = -(wR_i/c) + \alpha f(t - R_i/c).$$

It should be noted that if equation (4) represents the net signal present at an antenna array phase center, it can be immediately seen that the net signal received at each antenna element is different because the distance traveled, $R_i$, for the received signals is different for each antenna element.

ADAPTIVE ARRAY

Interference signals and multipath create different signal environments for a communications receiver. Multipath occurs when the transmitted signal of interest arrives at the receiver simultaneously from more than one direction. An interference source is a signal source unrelated to the communications system, such as the signal from another transmitter, that may or may not have the same frequency as the signal of interest. Historically, adaptive arrays were developed to reject external interference signals. More recently, adaptive arrays have been shown capable of rejecting multipath.

An adaptive array is an antenna array that has adjustable weights in each of the antenna elements which automatically adjusts the weights so that the multipath or interference signals are rejected. The weights can be amplitude scale factors multiplying the antenna element signals or implementations that are equivalent to this.

To demonstrate the way in which an array with adjustable weights can reject an indirect multipath signal or an interference signal, consider the two element array in FIG. 1. Let antenna elements 10 be omni-directional and let the spacing between them be a half-wave length of the desired signal.

The desired signal, P(t), arrives from the normal direction, 0 degrees, and the multipath or interference signal I(t) arrives from 30 degrees displaced from the desired signal. To simplify the calculation, let both P(t) and I(t) have zero phase at the array phase center, PC, which is located midway between the antenna elements. The output signal of each antenna element 10 goes to a variable complex weight 26", where $W_1 + jW_2$ and $W_3 + jW_4$ correspond to elements E1 and E2 respectively. The complex weights output signals are summed in adder 30, the output of which is the array output signal.

The signal of interest, in complex notation, is $$P(t) = P_o \exp(jwt), \quad (5)$$

where $P_o$ is the signal amplitude, t is time, and w is the signal angular frequency. The array output signal due to the signal of interest is $$SI(t) = P_o\{(W_1 + W_3) + j(W_2 + W_4)\} \exp(jwt). \quad (6)$$

The desired array output signal is an unaltered copy of the signal of interest. By equating equations (5) and (6), and collecting the real and imaginary terms, the required weight relationships to get the desired output signal are $$W_1 + W_3 = 1 \quad (7)$$

and $$W_2 + W_4 = 0. \quad (8)$$

The unwanted indirect path signal is $$I(t) = I_o \exp(jwt) \quad (9)$$

where $I_o$ is the signal amplitude. The distance traveled by the received signal is different for each antenna element. I(t), which is incidenting the antenna array from an angle of 30 degrees, will arrive at antenna element E2 with a phase lead relative to the antenna array phase center of $$\sigma = 2(\tfrac{1}{4}) \sin(30) = \pi/4 \quad (10)$$

radians and, similarly, it will arrive at antenna element E1 with a phase lag of $\sigma = -\pi/4$ radians. Therefore, the array output signal due to I(t) is $$SM(t) = I_o\{[W_1 + jW_2] \exp[j(wt - \pi/4)] + [W_3 + jW_4] \exp[j(wt + \pi/4)]\}. \quad (11)$$

Since it is desired to reject the unwanted multipath signal, equation (11) must equal zero. By using the relationships $$\exp(-j\pi/4) = (1/\sqrt{2})(1 - j) \quad (12)$$

and $$\exp(j\pi/4) = (1/\sqrt{2})(1 + j) \quad (13)$$

and collecting the real and imaginary terms, equation (11) gives $$W_1 + W_2 + W_3 - W_4 = 0 \quad (14)$$

and $$-W_1 + W_2 + W_3 + W_4 = 0. \quad (15)$$

The weights must satisfy equations (14) and (15) to reject the multipath signal.

Equations (9), (10), (14), and (15) give 4 equations and 4 unknowns. Solving for the weights gives $$W_1 = 0.5, \ W_2 = -0.5, \ W_3 = 0.5, \ W_4 = 0.5. \quad (16)$$

With these weight values the antenna array will accept the signal of interest, P(t), and reject the unwanted multipath signal, I(t). The array is functioning as a spatial filter.

In an adaptive array the weights are changed automatically to the correct values that reject the unwanted multipath/interference signals and accept the signal of interest. As the signal environment changes, the weights adapt to continue rejecting the multipath/interference. To be an adaptive array, the simple array in FIG. 1 requires a means for automatically changing the weights.

There are a number of approaches for changing the array weights automatically. Many examples of adaptive arrays can be found in: Robert A. Monzingo and Thomas W. Miller, *Introduction to Adaptive Arrays*, John Wiley & Sons, New York, 1980; Bernard Widrow and Samuel D. Stearns, *Adaptive Signal Processing*, Prentice-Hall, 1985; and C. F. N. Cowan and P. M. Grant Eds., *Adaptive Filters*, Prentice-Hall, Inc., 1985.

The Least Means Square (LMS) adaptive array, which requires a reference signal, is the best known and the best understood approach to automatically adjust the weights. It is also the simplest to implement.

In the LMS adaptive array the difference between the array output signal and the reference signal is called the error signal, $\epsilon$, and is used as a measure of merit in a least means squares sense to adapt the weights by minimizing $\epsilon^2$. The basic theory and technology for the LMS adaptive array has been presented by Bernard Widrow, Proceedings of the IEEE, Vol. 55, No. 12, December 1967, p. 2143 and by Ralph Compton, Proceedings of the IEEE, Vol. 61, No. 1, June 1973, P. 748. The books cited in the previous paragraph also present much theory about LMS adaptive array.

Figure 2:
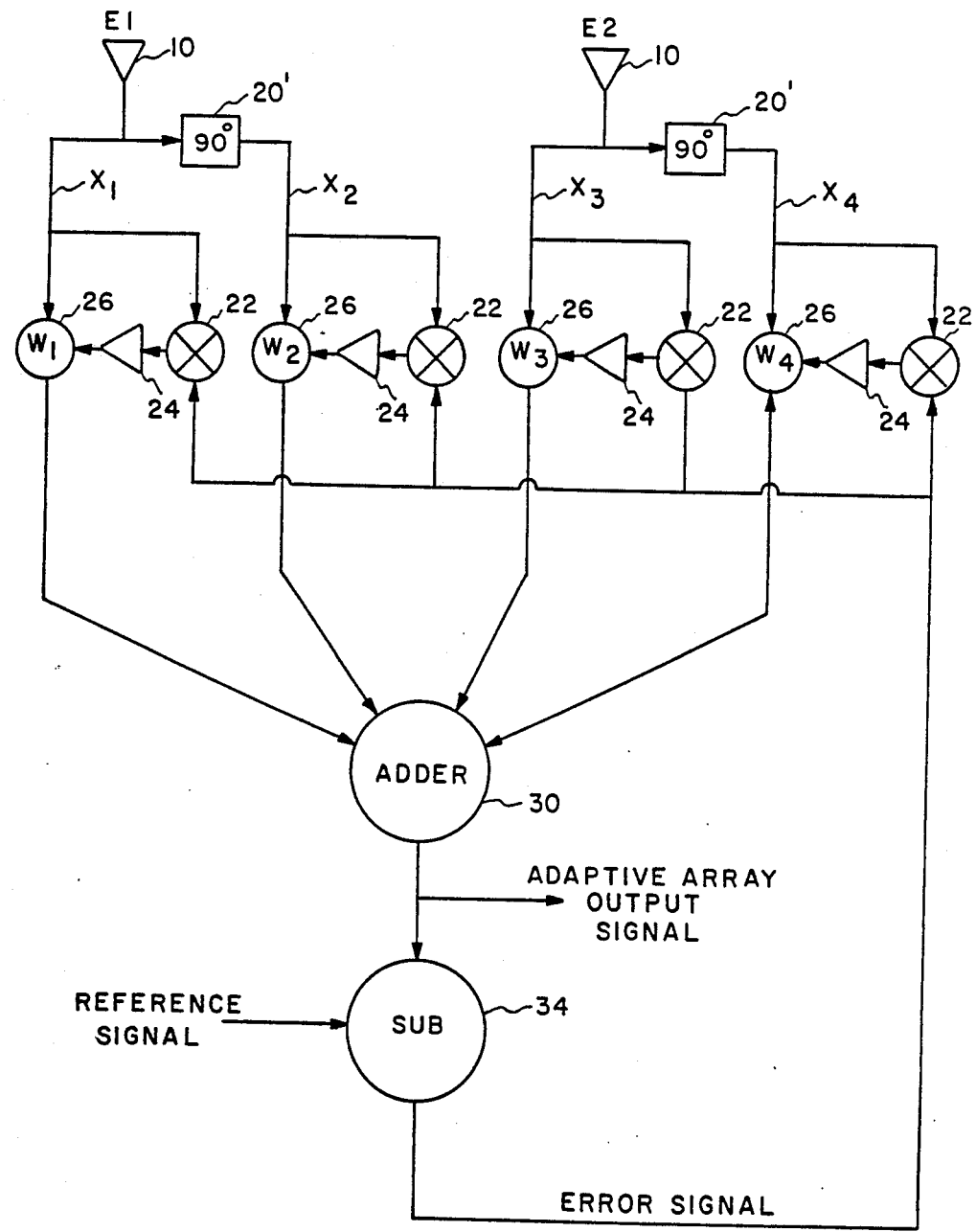
FIG. 2 is a block diagram of a two element adaptive array using an LMS analog implementation: prior art.

FIG. 2 shows a two element adaptive array using an LMS implementation. After the received signals, which include the signal of interest and multipath/interference, enter the antenna elements 10, each element splits the signal into two components; one component is phase shifted 90 degrees by 20', and the other component's phase is unshifted. Each signal then goes to its respective amplitude weight 26, which are $W_1$, $W_2$, $W_3$, and $W_4$ respectively. Because the signals going to each of the respective antenna element weight pairs are 90 degrees out of phase, they adjust the signal in the element in both amplitude and phase. For element E1, the amplitude weighting is $$A_w = \sqrt{W_1^2 + W_2^2} \quad (17a)$$

and the phase shift weighting is $$\phi_w = -\tan^{-1}(W_1/W_2). \quad (17b)$$

Element E2 has a similar result for weights $W_3$ and $W_4$. The weighted signals from weights $W_1$, $W_2$, $W_3$, and $W_4$ go to adder 30 where they are summed. The output signal of the adder 30 is the adaptive array output signal and it goes to subtractor 34. The second input signal to subtractor 34 is the reference signal, which, ideally, is a replica of the desired signal. The array output signal is subtracted from the reference signal by subtractor 34. It is this resulting difference $\epsilon$ between the array output signal and the reference signal that is used in the LMS adaptive arrays to automatically adjust the weights.

It can be shown that $$dW_i/dt = -k\nabla W_i(<\epsilon^2>) \; i=1, \ldots, N \quad (18a)$$

where $W_i$ is the "i"th weight, k is a constant, $\nabla W_i(<\epsilon^2>)$ is the component of the gradient of $<\epsilon^2>$ with respect to $W_i$ and $<>$ denotes the time average of the function contained therein. This gives for the value of the "i"th weight $$W_i = W0_i - 2k\int <\epsilon X_i>dt \; i=1, \ldots, N \quad (18b)$$

where $W0_i$ is the value of the "i"th weight at time zero, and $X_i$ is the input signal to the "i"th weight. Equations (18b) are the feedback equations for the weights in the analog implementation. The error signal $\epsilon$ from sub-tractor 34 and the weight input signals $X_1$, $X_2$, $X_3$, $X_4$ are multiplied by multipliers 22 respectively. The output signals from multipliers 22 go to integrators 24 respectively. The output signals of each of the integrators 24 is applied to its associated weight circuit 26, where that signal is weighted. The output signal from each weight circuit is then applied to adder 30 where they are summed. Each set of multiplier, integrator, weight circuit and input signal together with the error signal, subtractor, and adder constitute an adaptive loop.

The equivalent feedback equation for a discrete/digital implementation of the LMS adaptive array is $$W_i(j+1) = W_i(j) - 2k \nabla W_i(<\epsilon(j)^2>) \; i=1, \ldots N \quad (19a)$$

and $$W_i(j+1) = W_i(j) - 2k\epsilon(j)X_i(j) \; i=1, \ldots, N \quad (19b)$$

where the antenna element input signals are discrete time samples with $X_i(j)$ being the "i"th antenna element input signal at the "j"th time sample, $\epsilon(j)$ is the error signal at the "j"th time sample, $W_i(j)$ is the amplitude weight for the "i"th antenna element input signal at the "j"th sample, and $W_i(j+1)$ is the weight value update at the "j+1" time sample for the "i"th antenna element input signal.

The adaptive array is not restricted to two antenna elements and a 90 degree phase delay. It can have many antenna elements. And it can have many time (phase) delays in each antenna element.

CMA ADAPTIVE ARRAYS

The LMS adaptive array minimizes the mean square error between the array output signal and a reference signal. The CMA filter developed by Treichler minimizes a positive definite measure of the signal modulus variation given by $$J_{pq}(t) = <||Y(t)|^p - \delta^p|^q> \quad (20)$$

where "p" and "q" are constants, $\delta$ is a positive constant, and Y(t) is the adaptive filter output signal at time t. The feedback equation for the "i"th weight is $$W_i(t) = W0_i - 2k\int \nabla_{Wi}\{J_{pq}(t)\}dt \quad (21)$$

where k and $W0_i$ are constants and $\nabla_{Wi}\{J_{pq}(t)\}$ is the component of the gradient of $J_{pq}(t)$ with respect to $W_i$. It can be shown that $$\nabla_{Wi}J_{pq} = <qpX_i(t)Y(t)|Y(t)|^{p-2}(|Y(t)|^p - \delta^p)^{q-1}[sgn(|Y(t)|^p - \delta^p)]^q> \quad (22)$$

where $X_i(t)$ is the input signal to the "i"th weight and $$sgn(z) = \begin{cases} +1 & z \geq 0 \\ -1 & z < 0 \end{cases}$$

The feedback equations can be rewritten in the form $$W_i(t) = W0_i - 2k\int <\epsilon X_i(t)>dt \quad (23)$$

where $\epsilon$ is determined from equations (21) and (22). Table I shows $\epsilon$ for different values of p and q.

TABLE I

| p,q | | Eq # |
|---|---|---|
| 1,1 | $\{Y(t)/|Y(t)|\}\text{sgn}[|Y(t)| - \delta]$ | (24) |
| 1,2 | $2\{Y(t)/|Y(t)|\}[|Y(t)| - \delta]$ | (25) |
| 2,1 | $2Y(t)\text{sgn}\{|Y(t)|^2 - \delta^2\}$ | (26) |
| 2,2 | $4Y(t)\{|Y(t)|^2 - \delta^2\}$ | (27) |
| 1,3 | $3\{Y(t)/|Y(t)|\}\{|Y(t)| - \delta\}^2\text{sgn}[|Y(t)| - \delta]$ | (28) |
| 1,4 | $4\{Y(t)/|Y(t)|\}\{|Y(t)| - \delta\}^3$ | (29) |
| 3,1 | $3Y(t)|Y(t)|\text{sgn}\{|Y(t)|^3 - \delta^3\}$ | (30) |
| 3,2 | $6Y(t)|Y(t)|\{|Y(t)|^3 - \delta^3\}$ | (31) |

Equations of $\epsilon$ for values of "p" and "q" other than those shown in Table I have similar but more complicated form.

Feedback equation (25) is mathematically the same, within a sign and scale factor, as the equation obtained for the error signal in an LMS adaptive array that generates its reference signal by amplitude limiting the adaptive array output signal (Kenneth Rilling, U.S. patent application Ser. No. 819,416).

The adaptive array implementation of equation (25) results in a means for removing multipath that is very different from the CMA filter implementation:

(1) The CMA filter exploits the fact that for a constant modulus signal, multipath causes the amplitude to fluctuate significantly when the signal has a wide bandwidth. The LMS adaptive array is a spatial filter that also exploits the different directions of arrival the multipath signals.

(2) The CMA filter uses scaled, time shifted versions of the received input signal to remove unwanted multipath. The LMS adaptive array approach removes the unwanted multipath signals by placing an antenna pattern null in their direction of arrival.

(3) The CMA filter applies to wideband signals only. The LMS adaptive array approach applies to unmodulated carriers, narrowband signals, and wideband signals.

(4) The CMA filter requires a large number of adaptive loops. The LMS adaptive array approach can use as few as four linear adaptive loops (two antenna elements, each having two linear adaptive loops).

(5) The CMA filter applies to a single signal input adaptive filter. The LMS adaptive array approach applies to multiple signal inputs from an antenna array.

(6) The CMA filter does not use a reference signal. The LMS adaptive array uses a reference signal that is generated by amplitude limiting the adaptive array output signal.

(7) The CMA filter was derived by a whole new theory. The LMS adaptive array uses the traditional LMS theory.

(8) The CMA filter applies primarily to signals of constant modulus. The LMS adaptive array approach does not have this limitation.

Since the CMA feedback equation (25) occurred in the LMS adaptive array which removes unwanted multipath, it implies that the other CMA filter feedback equations obtained from equations (21) and (22) can also be used in an adaptive array to remove unwanted multipath. And it is the application of these feedback equations to an adaptive array that makes the invention different from the prior art. Just like the LMS adaptive array implementation of equation (25), the adaptive array implementation of the CMA feedback equations places an antenna pattern null in the direction of arrival of unwanted multipath/interference signals; these new CMA adaptive arrays work for broadband signals, narrowband signals and unmodulated carriers; they also work for signals without constant modulus such as AM signals. In addition, they require as few as four linear adaptive loops (two antenna elements and two linear adaptive loops for each antenna element).

By comparing equation (23) to the LMS feedback equation, equation (18b), it is seen that the CMA and LMS feedback equations have the same form. Only the definition of $\epsilon$ is different. $\epsilon$ for the LMS adaptive array is given by the difference between the adaptive array output signal and the reference signal. $\epsilon$ for the CMA feedback equations is derived from equations (21), (22), and (23). This means that the form of the weight adjustment is the same for the CMA adaptive array and LMS adaptive array except for the computing of $\epsilon$.

Figure 3:
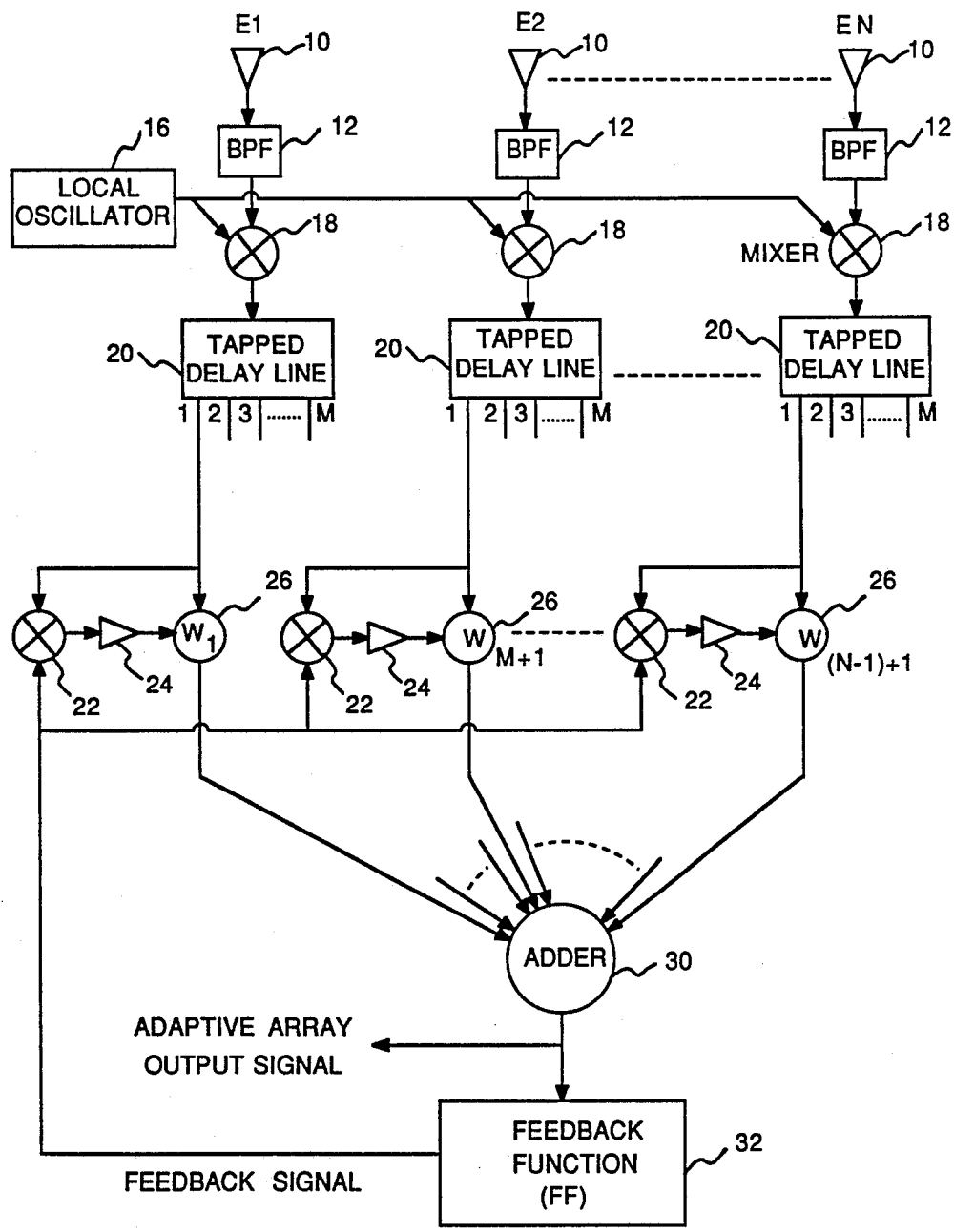
FIG. 3 is a block diagram of an N element CMA adaptive array with tapped delay lines having M output signals respectively.

FIG. 3 shows the generalized adaptive array implementation based on the CMA feedback equation (23) and the LMS feedback equation (18b). The input signals to the adaptive array are developed by appropriate input devices such as antenna elements 10, bandpass filters 12, and mixers 18. The second input signal to the mixers 18 is generated by a single local oscillator 16. Thus, mixers 18 convert the input signals to phase coherent signals at an appropriate IF frequency. The respective mixer 18 output signals go to a corresponding tapped delay line 20 which has M output terminals. Each tapped delay line 20 output signal goes to a corresponding amplitude weight circuit 26 and multiplier 22.

The output signal from each amplitude weight circuit 26 is applied to adder 30 where they are summed. The adder 30 output signal is the adaptive array output signal which goes to the appropriate next stage of signal processing, such as an IF amplifier, a demodulator, etc.

The output singal of adder 30 is also applied to feedback function circuit (FF) 32 which computes the feedback signal in equation (23). The form of FF 32 depends on the specific equation for $\epsilon$ being used and its particular implementation. Table I shows the equations of $\epsilon$ for some values of p and q. Specific implementations of FF 32 are presented below.

The output signal from FF 32 is applied to each multiplier 22. Each multiplier 22 multiplies the feedback signal from FF 32 with the corresponding output signal from tapped delay line 20. The output signal from each of multipliers 22 is applied to a corresponding integrator 24. The output signal of integrator 24 is applied to a corresponding amplitude weight circuit 26, which, accordingly, adjusts the weight values applied to the output signal of its corresponding tapped delay line 20. This weight adjustment process continues until the weights reach equilibrium values. The system adjusts the weights so that the unwanted multipath/interference signals are rejected, resulting in less distortion of the signal of interest at the adaptive array output signal.

Figure 15:
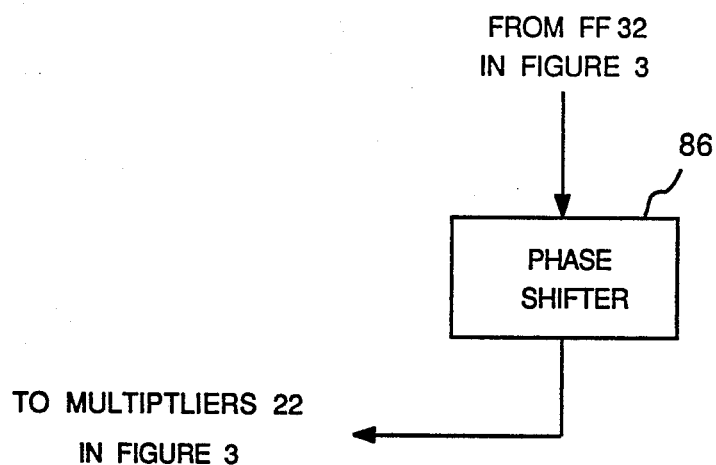
FIG. 15 is a block diagram of a phase shifter added to the N element CMA adaptive array and CMA filter in FIG. 3.

FIG. 15 shows a phase shifter 86 placed between FF 32 and multipliers 22 of FIG. 3. The output signal of FF 32 is applied to phase shifter 86. The output signal of phase shifter 86 is then applied to multipliers 22. The system functions in the same manner as the system in FIG. 3 except that the phase shifter 86 can shift the phase of the feedback signal to optimize the stability of the system if necessary, because as the phase is removed from the optimum value, the system can exhibit a drift.

It will be seen from the material presented below that although there are many possible values of p and q and that each pair of p and q values can have many implementations, there are only a handful of fundamental implementations. The other implementations are more elaborate versions of these fundamental imlementations.

Figure 4:
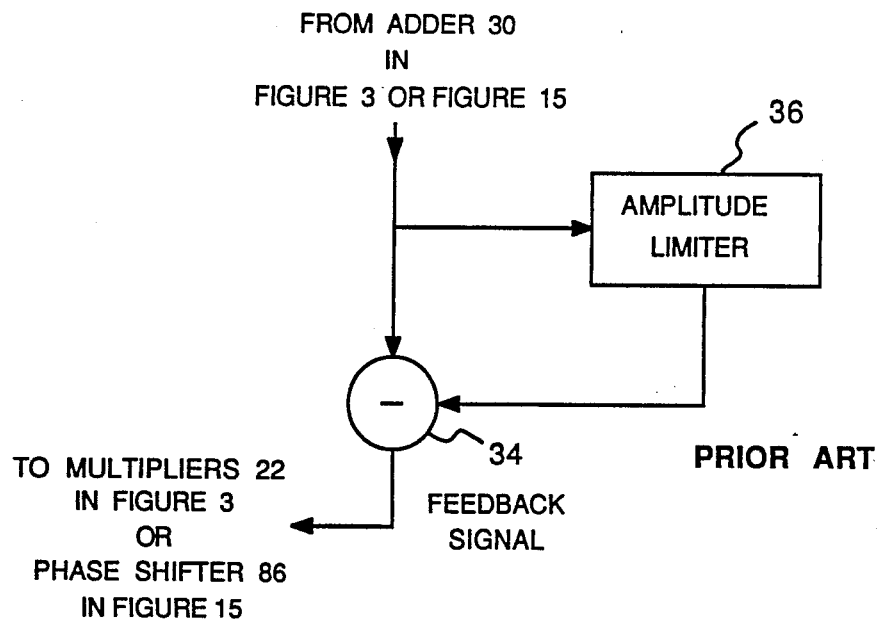
FIG. 4 is a block diagram of the feedback function implemented by Rilling in the reference signal model: prior art.

As discussed above, equation (25) can be implemented as an LMS adaptive array with the reference signal being generated by amplitude limiting the adaptive array output signal. This is an implementation of equation (25) where the equation is separated into to the two terms: $Y(t)$, the adaptive array output signal, and $\{Y(t)/|Y(t)|\}$, the generated reference signal. The FF 32 for this implementation is shown in FIG. 4. The adaptive array output signal from adder 30 in FIG. 3 goes to amplitude limiter 36 and subtractor 34. Amplitude limiter 36 amplitude limits the adder 30 output signal. The output signal of amplitude limiter 36 is the second input signal to subtractor 34. Subtractor 34 subtracts the output signal of adder 30 from the output signal of amplitude limiter 36. The output signal of subtractor 34 is the feedback signal $\epsilon$ and is an input signal to multipliers 22 in FIG. 3 (or phase shifter 86 in FIG. 15). In practice, to make equation (25) equivalent, to the prior art, the required sign change can be implemented in many other ways besides using the subtractor as given above. This implementation is prior art.

Figure 5:
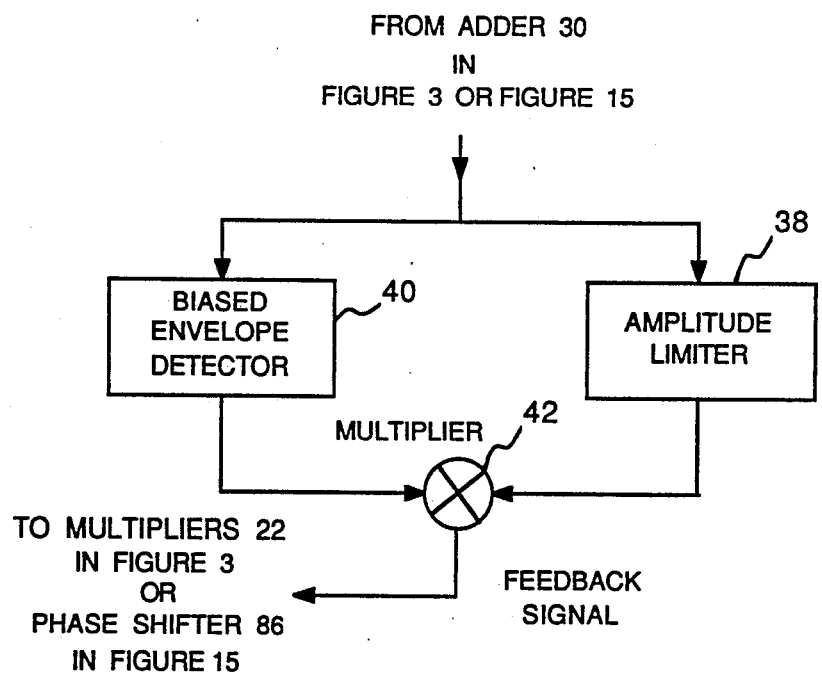
FIG. 5 is a block diagram of a first implementation of the feedback function for p=1 and q=2.
Figure 6:
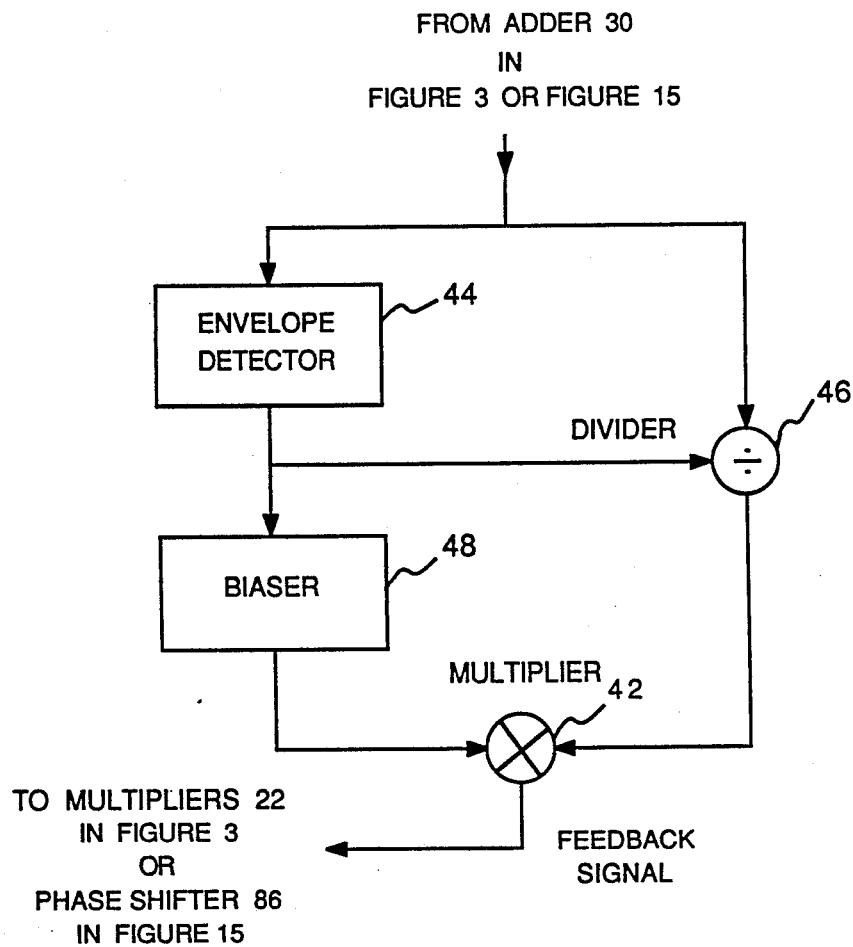
FIG. 6 is a block diagram of a second implementation of the feedback function for p=1 and q=2.

Equation (25) can also be separated into the two factors $2\{Y(t)/|Y(t)|\}$ and $\{|Y(t)|-\delta\}$. FIG. 5 and FIG. 6 show two FF 32 implementations of this form. In FIG. 5 the output signal of adder 30 is applied to a biased envelope detector 40 and an amplitude limiter 38. The amplitude limiter 38 amplitude limits the adder 30 output signal. The amplitude limiter 38 output signal goes to multiplier 42. The biased envelope detector 40 detects the envelope of the output signal of adder 30 and biases it a constant negative value. The output signal of biased envelope detector 40 is the second input signal to multiplier 42. The multiplier 42 multiplies the output signal of amplitude limiter 38 and the output signal of biased envelope detector 40. The output signal of multiplier 42 is the feedback signal $\epsilon$ and is applied to the multipliers 22 in FIG. 3 (or phase shifter 86 in FIG. 15). This form of the adaptive array is one embodiment of the present invention.

The second implementation is given in FIG. 6. The output signal from adder 30 in FIG. 3 is applied to the envelope detector 44 and the divider 46. The envelope detector 44 detects the envelope of the output signal of adder 30. The output signal of envelope detector 44 is applied to the biaser 48 and the divider 46. Biaser 48 shifts the output signal of envelope detector 44 a constant negative amount. The output signal of biaser 48 is one of the input signals to multiplier 42. Divider 46 divides the output signal from adder 30 by the output signal from envelope detector 44. The output signal of divider 46 is applied to multiplier 42. Multiplier 42 multiplies the output signals from divider 46 and biaser 48. The output signal of multiplier 42 is the feedback signal $\epsilon$ and is applied to multipliers 22 in FIG. 3 (or phase shifter 86 in FIG. 15). This form of the adaptive array is another embodiment of the present invention.

Equation (24) can be implemented by extending the implementations of equation (25). A sgn means, such as a comparator reference to zero volts, can be added to the implementation in FIG. 5 by having the the output signal of biased envelope detector 40 applied to the sgn means; and the output signal of sgn means is applied to multiplier 42. Similarly, equation (24) can be implemented through the addition of a sgn means to the implementation of equation (25) in FIG. 6 by having the output signal of biaser 48 applied to the sgn means, and the output signal of sgn means is applied to multiplier 42.

Figure 7:
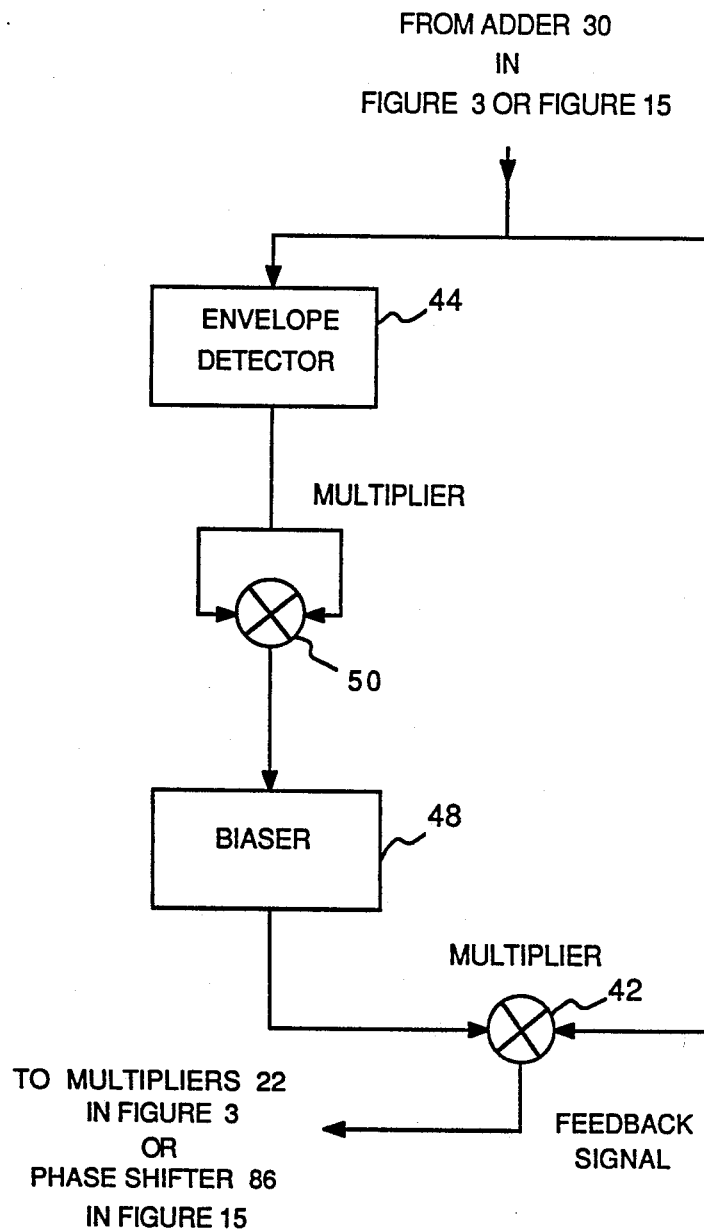
FIG. 7 is a block diagram of a first implementation of the feedback function for p=2 and q=2.

Equation (27) can be separated into the two factors $Y(t)$ and $\{|Y(t)|^2-\delta^2\}$. FIG. 7 shows an implementation of this form. The output signal of adder 30 in FIG. 3 is applied to multiplier 42 and to envelope detector 44. Envelope detector 44 detects the amplitude envelope of the output signal of adder 30. The output signal of envelope detector 44 is applied to both input terminals of multiplier 50. Multiplier 50, so connected, squares the output signal of envelope detector 44. The output signal of multiplier 50 is applied to biaser 48. Biaser 48 shifts the output signal of multiplier 50 a constant negative amount. The output signal of biaser 48 is the second input signal of multiplier 42. Multiplier 42 multiplies the output signals of biaser 48 and adder 30. The output signals of multiplier 42 is the feedback signal $\epsilon$ and is applied to multipliers 22 in FIG. 3 (or phase shifter 86 in FIG. 15). This form of the adaptive array is another embodiment of the present invention.

Figure 8:
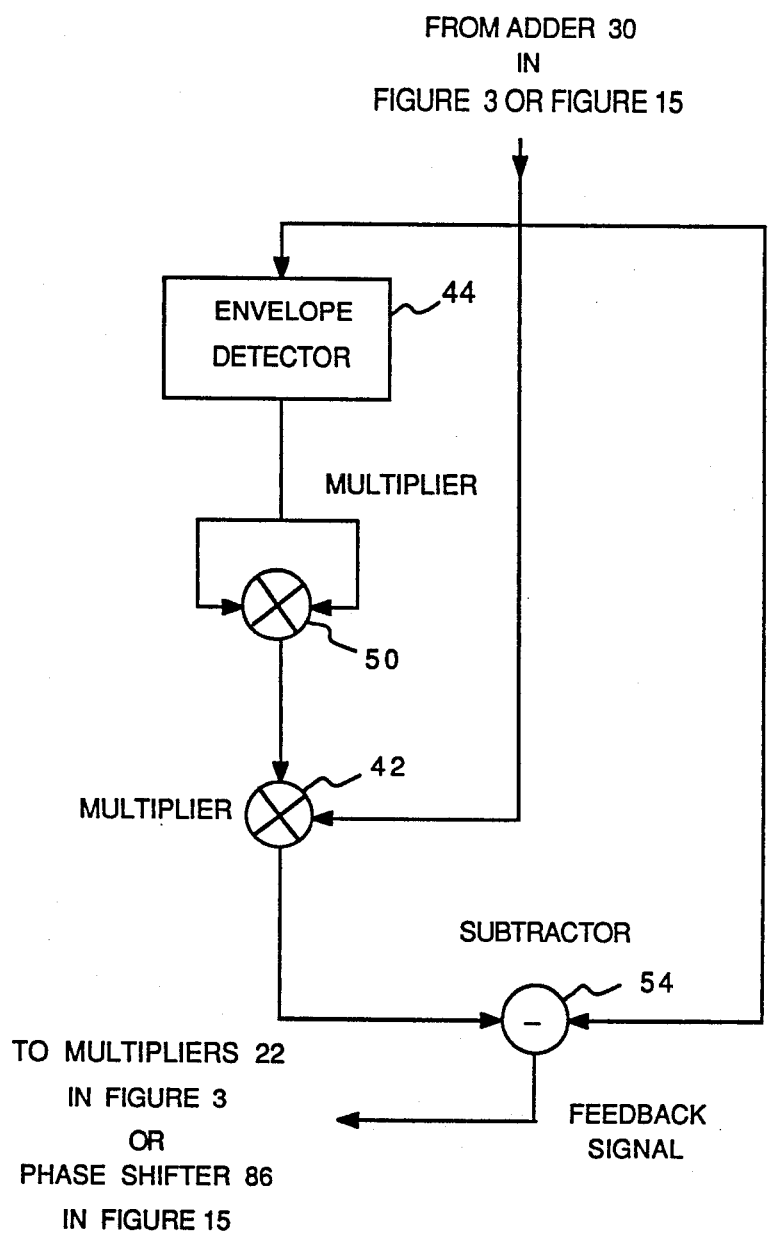
FIG. 8 is a block diagram of a second implementation of the feedback function for p=2 and q=2.

Equation (27) can also be separated into the two terms $4|Y(t)|^2 Y(t)$ and $-4\delta^2 Y(t)$. FIG. 8 shows an implementation where $\delta$ has been chosen to be equal to 1. The adaptive array output signal from adder 30 is applied to envelope detector 44 and subtractor 54. Envelope detector 44 detects the envelope of the output signal of adder 30. The output signal of envelope detector 44 is then applied to both input terminals of multiplier 50, which, as connected, squares the output signal of envelope detector 44. The output signal of multiplier 50 is also applied to multiplier 42. Multiplier 42 multiplies the output signal of multiplier 50 and the output signal of adder 30. The output signals of multiplier 42 is applied to subtractor 54. Subtractor 54 subtracts output signal of adder 30 from output signal of multiplier 42. The output signal of subtractor 54 is the feedback signal $\epsilon$ and it is applied to the multipliers 22 in FIG. 3 (or phase shifter 86 in FIG. 15). This form of the adaptive array is yet another embodiment of the present invention.

Equation (26) can be implemented by extending the implementation in FIG. 7 by placing a sgn means, such as a comparator referenced to zero volts, between the biaser 48 and the multiplier 42. The output signal of biaser 48 is applied to the sgn means, and the output signal of sgn means is in turn applied to multiplier 42.

The feedback equations corresponding to the other values of p and q are implemented by adding more multipliers, biasers, etc., to the FF 32 circuits already presented. They are extensions of the forms presented above.

The significant differences between these CMA adaptive array inventions and the CMA filters are:

(1) The CMA filter exploits the fact that for a constant modulus signal multipath causes the amplitude to fluctuate significantly when the signal has a wide bandwidth. The CMA adaptive array is a spatial filter that also exploits the difference directions of arrival of the multipath signals.

(2) The CMA filter uses a scaled, time shifted version of the received input signal to remove unwanted multipath. The CMA adaptive array approach removes the unwanted multipath signals by placing an antenna pattern null in their direction of arrival.

(3) The CMA filter applies only to wideband signals. The CMA adaptive array approach applies to unmodulated carriers, narrowband signals, and wideband signals.

(4) The CMA filter requires a large number of adaptive loops. The CMA adaptive array approach can use as few as four linear adaptive loops (two antenna elements, each having two linear weights).

(5) The CMA filter applies to single signal input. The CMA adaptive array approach applies to multiple signal inputs for an antenna array.

(6) The CMA filter applies primarily to signals of constant modulus. The CMA adaptive array approach does not have this limitation.

APPROXIMATE FEEDBACK EQUATION

Using equations (23) and (25), the feeback equation corresponding to equation (25) is $$W_i = W0_i - k | < X_i \{2[Y(t)/|Y(t)|][|Y(t)| - \delta]\} > dt \quad (32)$$

Let equation (30) be approximated by $$W_i = W0_i - \{k/|Y(t)|\} \int < X_i \{2Y(t)[|Y(t)| - \delta]\} > dt \quad (33)$$

where the factor $1/|Y(t)|$ is moved outside the integral. Feedback equation (33) can be used to derive a new form for the adaptive array. The feedback signal for equation (33) is $$\epsilon = 2Y(t)\{|Y(t)| - \delta\}. \quad (34)$$

Figure 9:
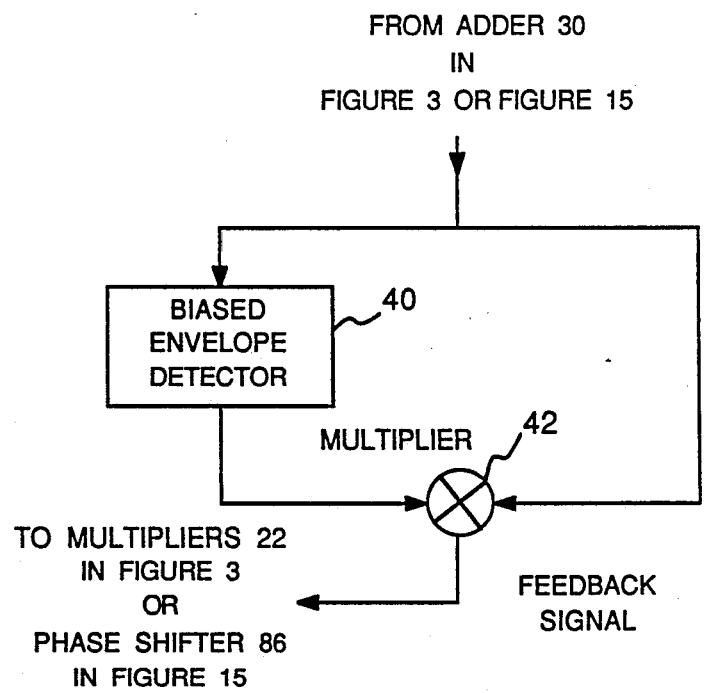
FIG. 9 is a block diagram of a first implementation of the approximate feedback function for p=1 and q=2.

Equation (34) can be separated into two factors: $2Y(t)$ and $[Y(t) - \delta]$. FIG. 9 shows an implementation of FF 32 for this form. The output signal from adder 30 is applied to both the baised envelope detector 40 and multiplier 42. The biased envelope detector 40 detects the amplitude envelope of the output signal of adder 30 and shifts it a constant negative amount. The output signal of biased envelope detector 40 is applied to the multiplier 42. Multiplier 42 multiplies the output signal of biased envelope detector 40 and output signal of adder 30. The output signal of multiplier 42 is the feedback signal $\epsilon$ and is applied to multiplier 22 in FIG. 3 (or phase shifter 86 in FIG. 15). This form of the adaptive array is still another embodiment of the present invention.

Figure 10:
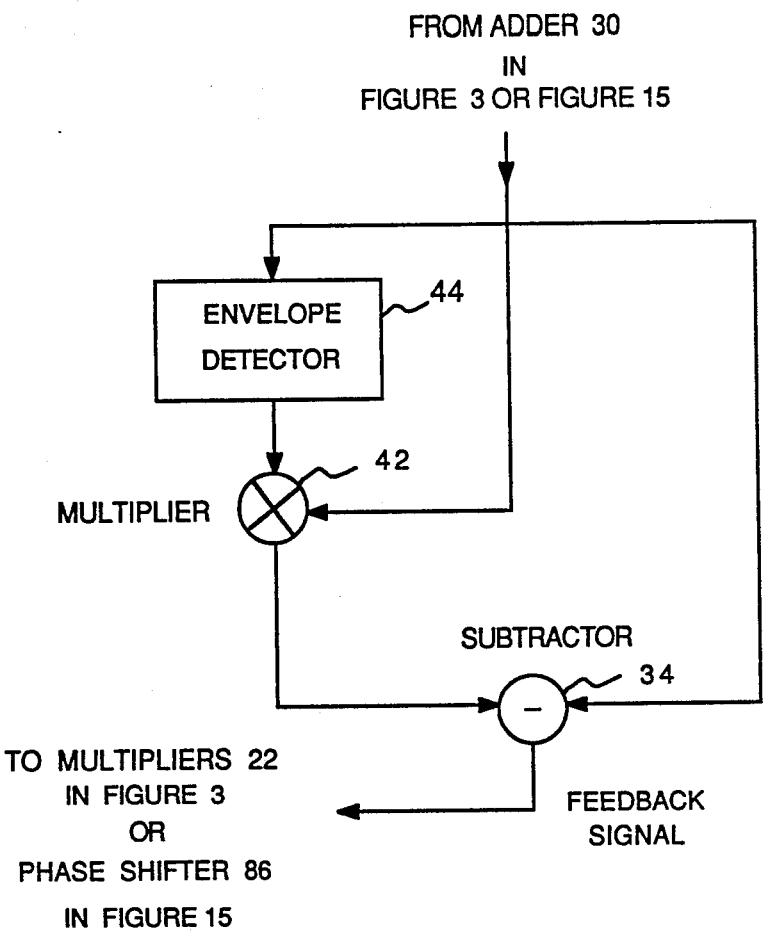
FIG. 10 is a block diagram of a second implementation of the approximate feedback function implementation for p=1 and q=2.

Equation (34) can also be separated into two terms: $2|Y(t)|Y(t)$ and $-2\delta Y(t)$. FIG. 10 shows an implementation of this two term separation for $\delta = 1$. The output signal of adder 30 in FIG. 3 is applied to envelope detector 44, multiplier 42, and subtractor 34. Envelope detector 44 detects the amplitude envelope of the output signal of adder 30. The output signal of envelope detector 44 is applied to multiplier 42. Multiplier 42 multiplies the output signal of envelope detector 44 and the output signal of adder 30. The output signal of multiplier 42 is applied to subtractor 34. Subtractor 34 subtracts the output signal of adder 30 from the output signal of multiplier 42. The output signal subtractor 34 is the feedback signal, $\epsilon$, and is applied to multipliers 22 in FIG. 3 (or phase shifter 86 in FIG. 15). This form of the adaptive array is a further embodiment of the present invention.

When the same approximation is applied to equation (24), the feedback equation becomes $$\epsilon = 2Y(t) \, \text{sgn}\, \{|Y(t)| - \delta\}. \quad (35)$$

Equation (35) can be implemented with an extension of the implementation in FIG. 9 through the addition of a sgn means, such as a comparator referenced to zero volts, between the biased envelope detector 40 and multiplier 42. The output signal of biased envelope detector 40 is applied to the sgn means; the output signal of the sgn means is applied to multiplier 42.

The other feedback equations for the different values of p and q with $|Y(t)|$ as a factor can also be approximated by moving the $|Y(t)|$ factor out of the integral in a similar manner.

RESTRICTED BIAS FEEDBACK EQUATION

The equations for $\epsilon$ which contain the "sgn" function permit further simplification to their implementation. Consider the case when $\delta$ is selected to be less than $|Y(t)|$. Since $\delta > 0$ and $|Y(t)| > 0$, $$|Y(t)| - \delta > 0 \quad (36)$$

$$|Y(t)|^2 - \delta^2 > 0 \quad (37)$$

$$|Y(t)|^3 - \delta^3 > 0. \quad (38)$$

Using equations (36), (37), and (38) and using the fact that $\text{sgn}(x) = 1$ when $x > 0$, equations (24), (26), (28), and (30) become respectively, $$\epsilon = Y(t)/|Y(t)| \quad (39)$$

$$\epsilon = 2Y(t) \quad (40)$$

$$\epsilon = 3\{Y(t)/|Y(t)|\}\{|Y(t)| - \delta\}^2 \quad (41)$$

$$\epsilon = 3Y(t)|Y(t)| \quad (42)$$

Implementation of equation (41) results in a more complex version of the implementation shown in FIG. 5. The output signal of biased envelope detector 40 is squared by a multiplier, the output signal of which goes to multiplier 42.

Figure 16:
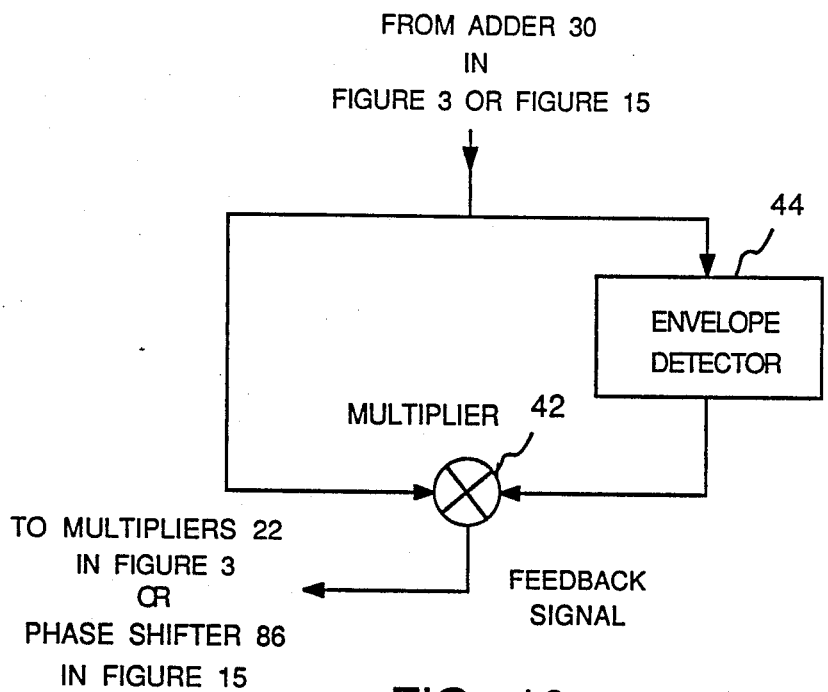
FIG. 16 is a block diagram of the implementation of the feedback function for p=3 and q=1 when the range of $\delta$ is restricted.

Equation (42) can be implemented as shown in FIG. 16. The output signal from adder 30 goes to the first input of multiplier 42 and the input of envelope detector 44. The output signal of envelope detector 44 goes to the second input of multiplier 42. The output signal of multiplier 42 is the feedback signal and goes to the multipliers 22 in FIG. 3 (or phase shifter 86 in FIG. 15). This form of the adaptive array is yet another embodiment of the present invention.

Figure 17:
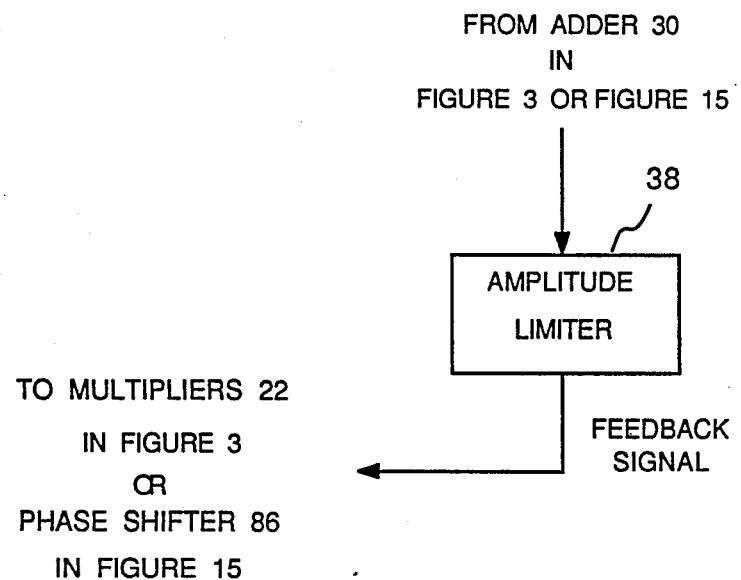
FIG. 17 is a block diagram of the implementation of the feedback function for p=1 and q=1 when the range of $\delta$ is restricted.

Equation (39) is the equation for amplitude limited $Y(t)$. Its implementation is shown in FIG. 17. The output signal from adder 30 in FIG. 3 is applied to the input of amplitude limiter 38. The output signal from amplitude limiter 38 is the feedback signal and is applied to multipliers 22 in FIG. 3 (or phase shifter 86 in FIG. 15). This form of the adaptive array is yet another embodiment of the present invention.

Figure 18:
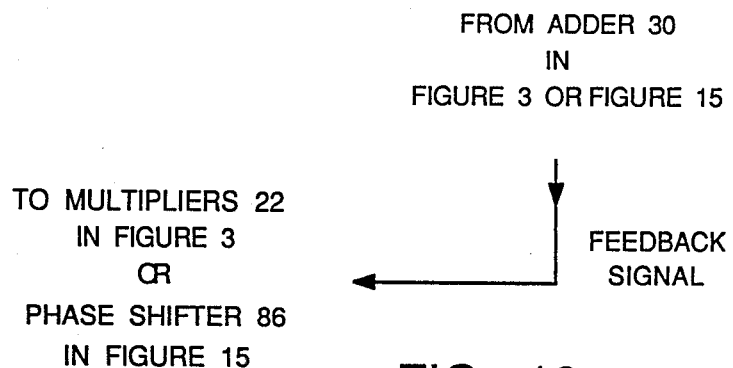
FIG. 18 is a block diagram of the implementation of the feedback function for p=2 and q=1 when the range of $\delta$ is restricted.

Implementation of equation (40) is important because it is the simplest implementation. Equation (40) is equivalent to the output signal from adder 30 multiplied by 2. Letting the factor of 2 be folded into the gain constant "k", equation (40) is implemented by using the output signal from adder 30 as the feedback signal. As shown in FIG. 18, the output signal from adder 30 in FIG. 3 is connected directly to multipliers 22 in FIG. 3 (or phase shifter 86 in FIG. 15). This is the simplest possible implementation of the feedback function. This simplicity is possible because of the natures of the multipath and low level interference problems that are being solved. This form of the adaptive array is yet another embodiment of the present invention.

Now consider the case where $\delta > |Y(t)|$. Since $sgn(x) = -1$ when $x < 1$, equations (24), (26), (27), and (30) yield equations which are the negative of equations (39) to (42). There implementation require a 180 degree phase shift from the implementation of equations (39) to (42).

LOG APPROACH

In equation (20), the fact that $|Y(t)|^P - \delta^P$ goes to zero when $|Y(t)| = \delta$ is exploited. An alternate approach is to use a logarithmic function. The feedback function can be written as $$\epsilon = Y(t) \log [|Y(t)|/\delta]. \quad (43)$$

Figure 19:
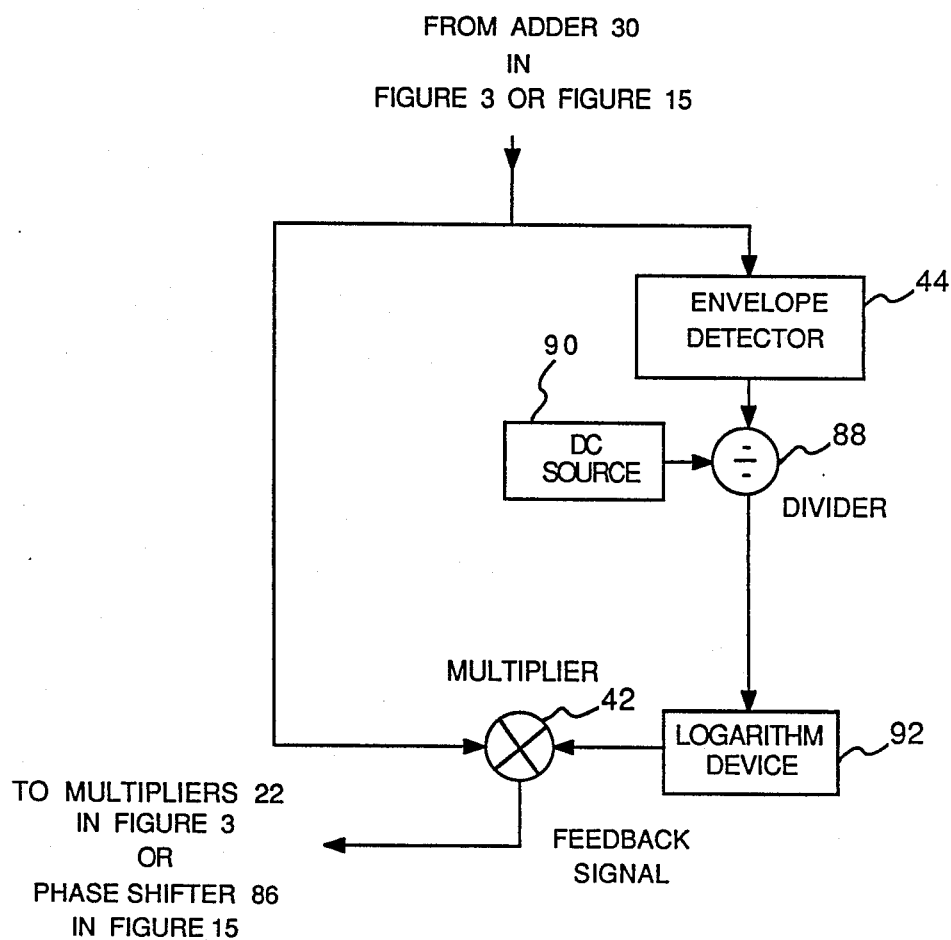
FIG. 19 is a block diagram of the implementation of the logarithmic feedback function.

FIG. 19 shows an implementation of FF 32 for equation (43). The output signal of adder 30 in FIG. 3 goes to envelope detector 44 and the first input of multiplier 42. The output signal of envelope detector 44 goes to the first input of divider 88. A second input signal to divider 88 from DC source 90, divides the first input signal to divider 88. The output signal from divider 88 is the input signal to logarithm device 92, such as a log amplifier. The output signal from logarithm device 92 goes to the second input of multiplier 42. The output signal from multiplier 42 is the feedback signal and goes to multipliers in FIG. 3 (or phase shifter 86 in FIG. 15). This form of the adaptive array is yet another embodiment of the present invention. This is a new invention.

Although all the equations and their approximations give rise to more complicated versions of the direct path feedback function implementation in FIG. 18, there are performance differences between them. They provide different convergence rates, different degrees of adapting to the ideal value, approach the steady state through different paths, etc. They also apply to different ranges of problem parameters; the less complicated implementations tend to apply to the narrower ranges. Consequently, one specific implementation can be more effective for a given signal environment than the other implementations.

The inventions presented here used the multiplier 22, the integrator 24, and the weighting function 26 to transform the weight value. But the inventions are not restricted to this algorithm. It can use other algorithms, which are available in antenna and adaptive filter literature to transform the weight values.

These new approximations and restricted parameters to the feedback equations for the CMA adaptive array can be applied to the CMA filter as well. FIG. 3 (or phase shifter 86 in FIG. 15) would have only a single input signal in this case (besides an antenna input signal, any other input signal made up of multiple images of the desired signal is applicable). The implementation of the feedback equations in FIGS. 9, 10, 16, 17, and 18 to the CMA filters are new inventions.

FIG. 3 and phase shifter 86 in FIG. 15 with the FF 32 implementations presented above are new inventions, however, the implementations of the inventions are not limited to the implementations presented.

All the above CMA adaptive arrays and filters can be implemented in software, digital, analog and hybrid form.

OTHER INTERFERENCE SOURCES

The present CMA adaptive array invention and filter invention embodiments presented above can also reduce distortion effects caused by other interference. When the amplitude of the signal of interest is greater than the amplitude of the interference signal, the interference signal is rejected. This is to be expected because the LMS adaptive array (Rilling U.S. patent application Ser. No. 819,416) and CMA filter reject the same type of interference.

HARDWARE

Presented below are manufacturer part/model numbers for the key components of a specific hardware implementation of FIG. 3 (and FIG. 15) using the FF 32 implementations presented above. These implementations operate at the intermediate frequency of 10 Mhz after down converting from the received frequency with mixers 18 and local oscillator 16. The tapped delay lines 20 can be implemented with a Data Delay Devices 1505-100A tapped delay line. It has equal taps which, when including an undelayed version of the antenna element input signal, gives the tapped delay line 20 six output terminals. For narrow bandwidth signals, an alternative to the tapped delay line is the ninety degree hybrid which can be implemented by the Mini-Circuits PSCQ-2-10.5. The multiplier 22 can be implemented with Mini-Circuits SBL-1 mixer operated in the linear multiplication region. The integrator 24 can be implemented with National Semiconductor LH0032 operational amplifier in an integrator circuit configuration. The amplitude weight circuit 26, multiplier 56, multiplier 50, and multiplier 42 can be implemented with the Motorola MC1595 four quadrant linear multiplier. The adder 30 can be implemented from a network of Mini-Circuits MSC-2-1 two way power combiners where the number of signals to be summed determines the number of power combiners required. The amplitude limiters 34 and 38 can be implemented by an Avantek, Inc. UTL-1002 signal limiter. The subtractor 54 can be implemented by a Mini-Circuits PSCJ-2-1 180 degree two way power combiner. The biaser 48 can be implemented by the National Semiconductor LH0032 operational amplifier and a DC voltage source. The divider 46 can be implemented by the Motorola MC1595 four quadrant linear multiplier and a National Semiconductor LH0032 operational amplifier. The envelope detector can be implemented by diode a detector and the bias envelope detector can be implemented by a diode detector operational amplifier with a DC voltage biasing the output signal of the envelope detector. For narrowband signals the phase shifter 86 can be implemented by a Data Delay Device 1503-100A variable delay.

These are just one specific set of hardware for implementing the various embodiments of the present CMA adaptive array and filter inventions, however, the inventions are not limited to the use of these components or these specific implementations.

SOFTWARE

Figure 11:
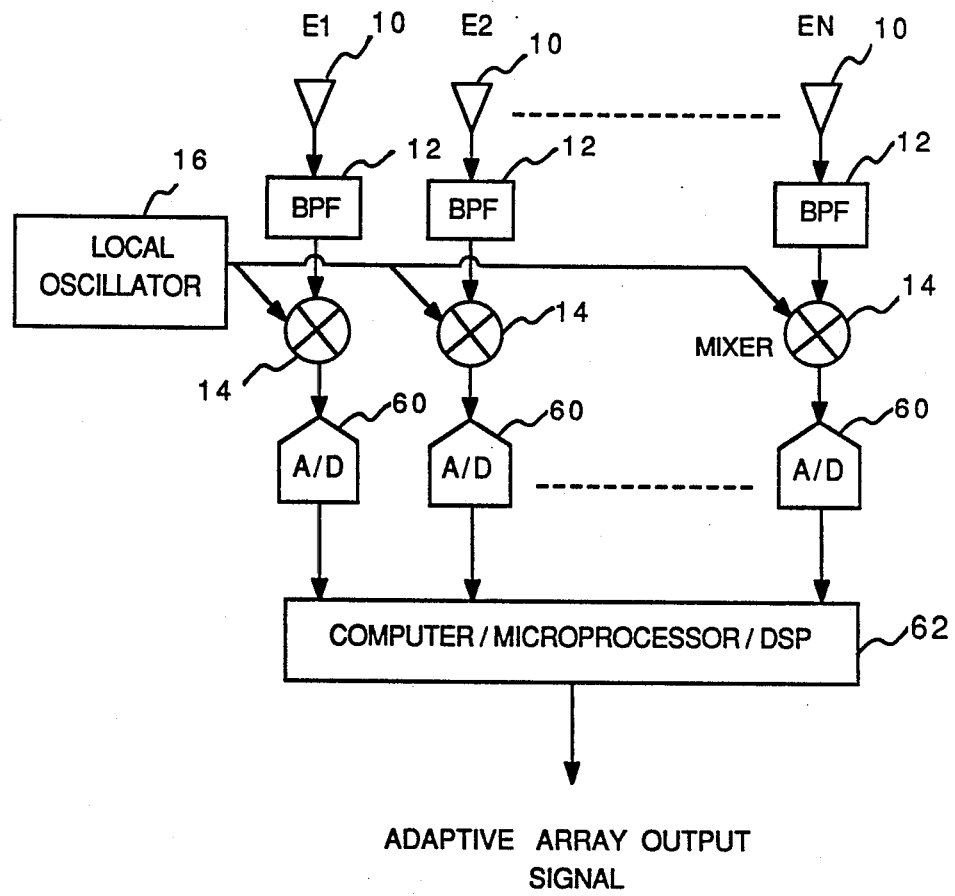
FIG. 11 is a block diagram of a computer implementation of the invention.

FIG. 11 shows the adaptive array which uses a computer, microprocessor, or digital signal processors (DSP). The signal of interest and the unwanted multipath/interference signals are received by the antenna elements 10. Each of the composite signals received by each antenna is applied to a bandpass filter 12. The output signal of bandpass filter 12 is applied to a mixer 14. EAch of mixers 14 also receives a second input signal which is the output signal of the local oscillator 16. Each of the output signals of mixer 14 are applied to an analog to digital (A/D) converter 60. The output signal from each A/D converter 60 is applied to the computer/microprocessor/DSP 62. The CMA adaptive array algorithm implemented in the computer/microprocessor/DSP 62. For the CMA filter, only a single input signal will be received by the computer/microprocessor/DSP 62.

Figure 12:
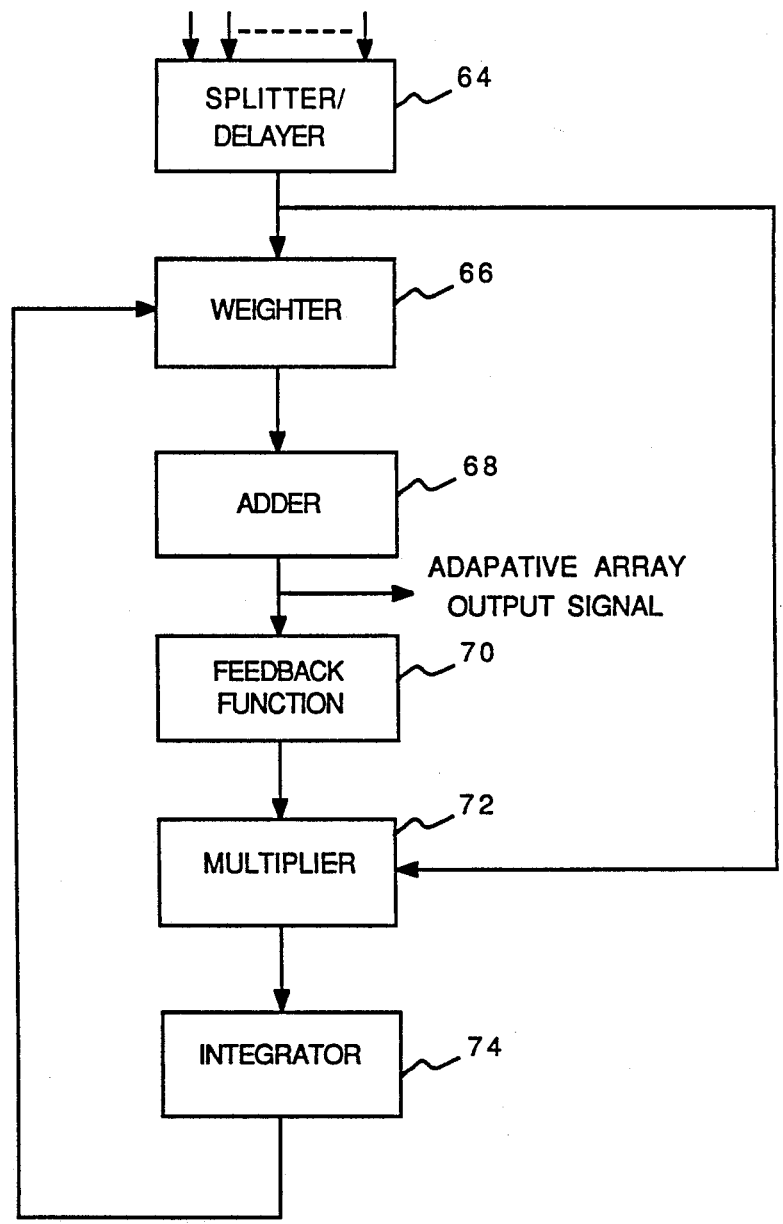
FIG. 12 is the flowchart of a software CMA adaptive array and filter implementation of the invention.

FIG. 12 shows a flow chart for software implementations of the CMA adaptive arrays and filters, however, the software implementations of the various embodiments of the present invention are not limited to the implementations presented below. Each of the digitized antenna element signals from A/D converters 60 go to splitter/delayer 64. The splitter/delayer 64 makes copies of each input signal and delays each copy an appropriate length of time in such a way that it is the software equivalent of an M output tapped delay line; the number of copies of each input signal and the magnitude of each time delay depends on the signal frequencies, signal bandwidth, signal environment, performance required, etc. Each signal copy is associated with an adaptive loop. The splitter/delayer 64 output signal goes to the weighter 66 where each of the input antenna element signals, delayed and undelayed, are weighted by an initial weight value. The splitter/delayer 64 output signal also goes to multiplier 72. The weighted signals from weighter 66 are summed in adder 68. The output signal of adder 68 is the adaptive array output signal and goes to feedback function 70. Feedback function 70 computes the feedback signal $\epsilon$. Which specific feedback equation is implemented by feedback function 70 depends on which values of p and q are chosen in equations (21), (22), and (23) and, where appropriate, whether an approximation is chosen. Two examples of feedback function 70 implementations are presented below. The output signal from feedback function 70 goes to multiplier 72. Multiplier 72 multiplies the feedback signal $\epsilon$ with each of the delayed and undelayed signals from splitter/delayer 64. The multiplied output signals for each adaptive loop from multiplier 72 goes to integrator 74. Integrator 74 integrates the output signal of multiplier 72 for each respective adaptive loop. The integrator 74 output signal goes to weighter 66 which updates the value of each corresponding weight. This cycle continues to repeat itself with the weight values converging to their equilibrium values.

Figure 13:
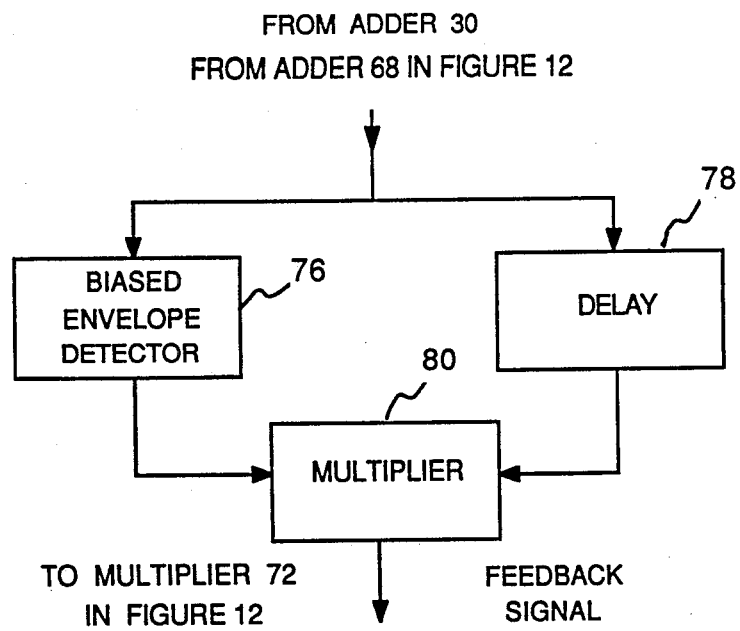
FIG. 13 is a flow chart of the approximate feedback function for a software implementation for p=1 and q=2.

FIG. 13 shows the flow chart for the feedback function 70 for one software implementation of equation (32) when it is separated into the terms $2Y(t)$ and $2[Y(t)-\delta]$. The output signal of adder 68 in FIG. 12 goes to the biased envelope detector 76 and delay 78. The biased envelope detector 76 determines the signal envelope of the adder 68 output signal. One such envelope detector implementation would be a relative peak detector. The detected envelope signal is biased by a constant negative value. The biased envelope detector 76 output signal goes to multiplier 80. When necessary, delay 78 delays the output signal of adder 68 to account for a time delay required to implement the biased envelope detector 76 so that the output signal of biased envelope detector 76 and the output signal of adder 68 are properly synchronized. The output signal of delay 78 goes to multiplier 80. Multiplier 80 multiplies the output signal of biased envelope detector 76 and the output signal of delay 78. The output signal of multiplier 80 is the feedback signal $\epsilon$ and goes to multiplier 72 in FIG. 12.

Figure 14:
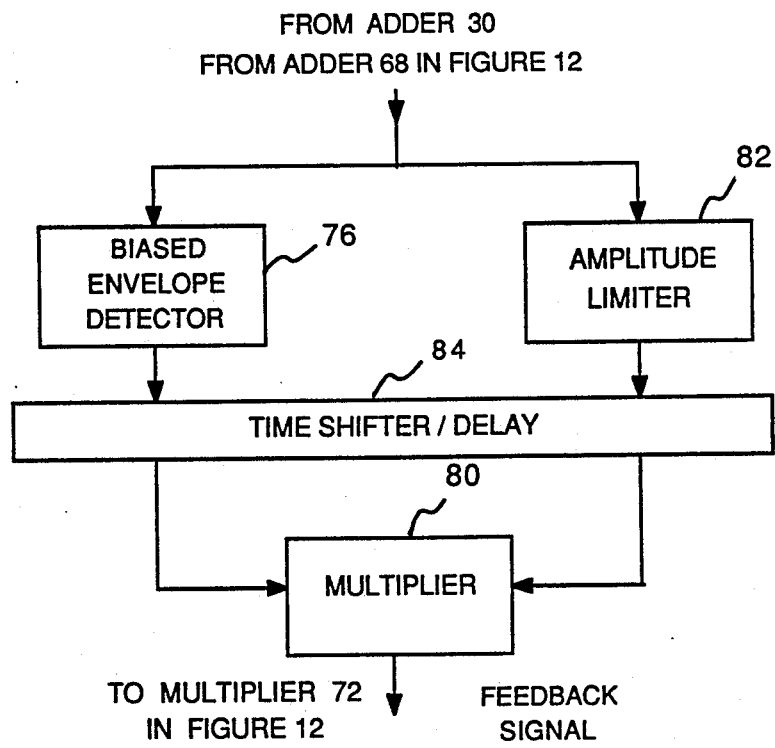
FIG. 14 is a flow chart of the feedback function for the software implementation for p=1 and q=2.

FIG. 14 shows the flow chart for the feedback function 70 for one software implementation of equation (25) when separated into the two factors $2\{Y(t)/|Y(t)|\}$ and $\{|Y(t)|-\delta\}$. The output signal of adder 68 in FIG. 12 goes to the biased envelope detector 76 and amplitude limiter 82. One implementation of the amplitude limiter is a clamper and lowpass digital filter.

At each data sample, the clamper assigns to the output signal of adder 68 an amplitude of $+F$ if the output signal of adder 30 is positive and $-F$ if the output signal of adder 30 is negative. The constant F is set at a convenient value determined by the amplitude of the input signals, parameter values of other software functional blocks, round off errors, required performance, etc. The clamper output signal is of a rectangular wave form and goes to the digital filter which removes the second and higher harmonics to convert its rectangular wave form to a sinusoid form of constant amplitude. The resulting output signal from the digital filter is an amplitude limited version of the output signal of adder 68. The amplitude limiter 82 output signal goes to delay 84.

The biased envelope detector 76 determines the signal amplitude envelope of the output signal of adder 68. One such envelope detector implementation would be a relative peak detector. The detected envelope signal is biased by a constant negative value. The output signal of biased envelope detector 76 also goes to delay 84.

Delay 84 appropriately delays either the output signal of biased envelope detector 76 or the output signal of amplitude limiter 82 so that the two signals are properly synchronized. Which of the two signals is actually delayed depends on the details of the specific implementations of the biased envelope detector 76 and the amplitude limiter 82. The synchronized output signals of the biased amplitude detector 76 and of amplitude limiter 82 go from delay 84 to multiplier 80. Multiplier 80 multiplies these output signals. The multiplier 80 output signal is the feedback signal and goes to multiplier 72 in FIG. 12.

It would be clear to a person skilled in the art that the adaptive array and filter software implemented by the CMA adaptive array and filter software flowchart in FIG. 12, FIG. 13, and FIG. 14 can be implemented by other means.

It would be clear for someone skilled in the art that the invention can be implemented in either digital, analog/digital hybrid, software/digital hybrid or analog/software hybrid forms.

From the forgoing description, it will be apparent that the invention disclosed herein provides novel and advantageous signal processing systems. It will be understood by those familiar with the art, the invention may be embodied in other specific forms without departing from the spirit or essential characteristics thereof.

What is claimed is:

1. A signal processing system for reducing distortion effects in communication receivers due to multipath, said system comprising:
   adaptive array means having:
     at least two antenna elements;
     weighting means coupled to the antenna elements for selectively weighting the received signals by a selected weight factor; and
     summing means for adding together the signals from the weighting means for generating an adaptive array output signal;
   envelope detector means coupled to receive said adaptive array output signal for generating the amplitude envelope of said adaptive array output signal; and first multiplier means coupled to receive the envelope detector means output signal and coupled to receive the adaptive array output signal for generating a feedback signal;

said adaptive array means also including a second multiplier means for each weighting means coupled to receive the feedback signal and coupled to receive the corresponding weighting means input signal, the output signal of which is coupled to a corresponding integrator means whose output signal is coupled to the corresponding weighting means for automatically redefining the weight factors.

2. A system as in claim 1 further includes a phase adjustment means for adjusting the phase of the feedback signal.

3. A signal processing system for reducing distortion effects in communication receivers due to multipath, said system comprising:
adaptive array means having:
at least two antenna elements;
weighting means coupled to the antenna elements for selectively weighting the received signals by a selected weight factor; and
summing means for adding together the signals from the weighting means for generating an adaptive array output signal; and
amplitude limiter means coupled to receive the said adaptive array output signal for generating an amplitude limited adaptive array output signal as the feedback signal;
said adaptive array means also including a multiplier means for each weighting means coupled to receive the feedback signal and coupled to receive the corresponding weighting means input signal, the output signal of which is coupled to a corresponding integrator means whose output signal is coupled to the corresponding weighting means for automatically redefine the weight factors.

4. A system as in claim 3 further includes a phase adjustment means for adjusting the phase of the feedback signal.

5. A signal processing system for reducing distortion effects in communication receivers due to multipath, said system comprising:
adaptive array means having:
at least two antenna elements;
weighting means coupled to the antenna elements for selectively weighting the received signals by a selected weight factor; and
summing means for adding together the signals from the weighting means for generating an adaptive array output signal and feedback signal;
said adaptive array means also including a multiplier means for each weighting means coupled to receive the feedback signal and coupled to receive the corresponding weighting means input signal, the output signal of which is coupled to a corresponding integrator means whose output signal is coupled to the corresponding weighting means for automatically redefine the weight factors.

6. A system as in claim 5 further includes a phase adjustment means for adjusting the phase of the feedback signal.

7. A signal processing system for reducing distortion effects in communication receivers due to interference signals with signal amplitudes less than the signal amplitude of the signal of interest, said system comprising:
adaptive array means having:
at least two antenna elements;
weighting means coupled to the antenna elements for selectively weighting the received signals by a selected weight factor; and
summing means for adding together the signals from the weighting means for generating an adaptive array output signal;
envelope detector means coupled to receive said adaptive array output signal for generating the amplitude envelope of said adaptive array output signal; and
first multiplier means coupled to receive the envelope detector means output signal and coupled to receive the adaptive array output signal for generating a feedback signal;
said adaptive array means also including a second multiplier means for each weighting means coupled to receive the feedback signal and coupled to receive the corresponding weighting means input signal, the output signal of which is coupled to a corresponding integrator means whose output signal is coupled to the corresponding weighting means for automatically redefining the weight factors.

8. A system in claim 7 further includes a phase adjustment means for adjusting the phase of the feedback signal.

9. A signal processing signal for reducing distortion effects in communication receivers due to interference signals with signal amplitudes less than the signal amplitude of the signal of interest, said system comprising:
adaptive array means having:
at least two antenna elements;
weighting means coupled to the antenna elements for selectively weighting the received signals by a selected weight factor; and
summing means for adding together the signals from the weighting means for generating an adaptive array output signal; and
amplitude limiter means coupled to receive the said adaptive array output signal for generating an amplitude limited adaptive array output signal as the feedback signal;
said adaptive array means also including a multiplier means for each weighting means coupled to receive the feedback signal and coupled to receive the corresponding weighting means input signal, the output signal of which is coupled to a corresponding integrator means whose output signal is coupled to the corresponding weighting means for automatically redefine the weight factors.

10. A system as in claim 9 further includes a phase adjustment means for adjusting the phase of the feedback signal.

11. A signal processing system for reducing distortion effects in communication receivers due to interference signals with signal amplitudes less than the signal amplitude of the signal of interest, said system comprising:
adaptive array means having:
at least two antenna elements;
weighting means coupled to the antenna elements for selectively weighting the received signals by a selected weight factor; and
summing means for adding together the signals from the weighting means for generating an adaptive array output signal and feedback signal;

said adaptive array means also including a multiplier means for each weighting means coupled to receive the feedback signal and coupled to receive the corresponding weighting means input signal, the output signal of which is coupled to a corresponding integrator means whose output signal is coupled to the corresponding weighting means for automatically redefine the weight factors.

12. A system as in claim 11 further includes a phase adjustment means for adjusting the phase of the feedback signal.

13. A signal processing system for reducing distortion effects due to multiple signal images, said system comprising:
adaptive filter means having:
one input signal element;
weighting means coupled to the antenna element for selectively weighting the received signals by a selected weight factor; and
summing means for adding together the signals from the weighting means for generating an adaptive filter output signal;
envelope detector means coupled to receive said adaptive filter output signal for generating the amplitude envelope of said adaptive filter output signal; and
first multiplier means coupled to receive the envelope detector means output signal and coupled to receive the adaptive filter output signal for generating a feedback signal;
said adaptive filter means also including a second multiplier means for each weighting means coupled to receive the feedback signal and coupled to receive the corresponding weighting means input signal, the output signal of which is coupled to a corresponding integrator means whose output signal is coupled to the corresponding weighting means for automatically redefining the weight factors.

14. A system as in claim 13 further includes a phase adjustment means for adjusting the phase of the feedback signal.

15. A signal processing system for reducing distortion effects due to multiple signal images, said system comprising:
adaptive filter means having:
one input signal element;
weighting means coupled to the antenna element for selectively weighting the received signals by a selected weight factor; and
summing means for adding together the signals from the weighting means for generating an adaptive filter output signal; and
amplitude limiter means coupled to receive the said adaptive filter output signal for generating an amplitude limited adaptive filter output signal as the feedback signal;
said adaptive filter means also including a multiplier means for each weighting means coupled to receive the feedback signal and coupled to receive the corresponding weighting means input signal, the output signal of which is coupled to a corresponding integrator means whose output signal is coupled to the corresponding weighting means for automatically redefine the weight factors.

16. A system as in claim 15 further includes a phase adjustment means for adjusting the phase of the feedback signal.

17. A signal processing system for reducing distortion effects due to multiple signal images, said system comprising:
adaptive filter means having:
one input signal element;
weighting means coupled to the antenna element for selectively weighting the received signals by a selected weight factor; and
summing means for adding together the signals from the weighting means for generating an adaptive filter output signal and feedback signal;
said adaptive filter means also including a multiplier means for each weighting means coupled to receive the feedback signal and coupled to receive the corresponding weighting means input signal, the output signal of which is coupled to a corresponding integrator means whose output signal is coupled to the corresponding weighting means for automatically redefine the weight factors.

18. A system as in claim 17 further includes a phase adjustment means for adjusting the phase of the feedback signal.

19. A signal processing system for reducing distortion effects in communication receivers due to multipath, said system comprising:
adaptive array means having:
at least two antenna elements;
weighting means coupled to the antenna elements for selectively weighting the received signals by a selected weight factor; and
summing means for adding together the signals from the weighting means for generating an adaptive array output signal;
envelope detector means coupled to receive said adaptive array output signal for generating the amplitude envelope of said adaptive array output signal;
DC source means for supplying a DC signal;
divider means coupled to receive envelope detector means output signal and coupled to receive DC source means output signal which divides envelope detector means output signal by DC source means output signal;
logarithm device means coupled to receive divider means output signal for generating the logarithm of divider means output signal; and
first multiplier means coupled to receive logarithm means output signal and coupled to receive the adaptive array output signal for generating a feedback signal;
said adaptive array means also including a second multiplier means for each weighting means coupled to receive the feedback signal and coupled to receive the corresponding weighting means input signal, the output signal of which is coupled to a corresponding integrator means whose output signal is coupled to the corresponding weighting means for automatically redefining the weight factors.

20. A system as in claim 19 further includes a phase adjustment means for adjusting the phase of the feedback signal.

21. A signal processing system for reducing distortion effects in communication receivers due to interference signals with signal amplitudes less than the signal amplitude of the signal of interest, said system comprising:
adaptive array means having:
at least two antenna elements;

weighting means coupled to the antenna elements for selectively weighting the received signals by a selected weight factor; and summing means for adding together the signals from the weighting means for generating an adaptive array output signal;

envelope detector means coupled to receive said adaptive array output signal for generating the amplitude envelope of said adaptive array output signal;

DC source means for supplying a DC signal;

divider means coupled to receive envelope detector means output signal and coupled to receive DC source means output signal which divides envelope detector means output signal by DC source means output signal;

logarithm device means coupled to receive divider means output signal for generating the logarithm of divider means output signal; and first multiplier means coupled to receive logarithm means output signal and coupled to receive the adaptive array output signal for generating a feedback signal;

said adaptive array means also including a second multiplier means for each weighting means coupled to receive the feedback signal and coupled to receive the corresponding weighting means input signal, the output signal of which is coupled to a corresponding integrator means whose output signal is coupled to the corresponding weighting means for automatically redefining the weight factors.

22. A system as in claim 21 further includes a phase adjustment means for adjusting the phase of the feedback signal.

* * * * *